(12) United States Patent
Waller et al.

(10) Patent No.: US 8,562,926 B2
(45) Date of Patent: Oct. 22, 2013

(54) METHOD AND DEVICE FOR CATCHMENT OF PLATINUM GROUP METALS IN A GAS STREAM

(75) Inventors: David Waller, Porsgrunn (NO); David M. Brackenbury, Porsgrunn (NO); Ketil Evjedal, Stathelle (NO)

(73) Assignee: Yara International ASA, Oslo (NO)

( * ) Notice: Subject to any disclaimer, the term of this patent is extended or adjusted under 35 U.S.C. 154(b) by 0 days.

(21) Appl. No.: 13/290,384

(22) Filed: Nov. 7, 2011

(65) Prior Publication Data

US 2012/0076710 A1 Mar. 29, 2012

Related U.S. Application Data

(62) Division of application No. 12/310,820, filed as application No. PCT/NO2007/000317 on Sep. 7, 2007, now Pat. No. 8,105,975.

(30) Foreign Application Priority Data

Sep. 8, 2006 (NO) .................................. 20064060

(51) Int. Cl.
| | |
|---|---|
| *B01D 53/56* | (2006.01) |
| *B01D 53/94* | (2006.01) |
| *B01J 8/00* | (2006.01) |
| *B01J 23/00* | (2006.01) |
| *B01J 21/00* | (2006.01) |
| *C01B 21/00* | (2006.01) |
| *C01B 23/00* | (2006.01) |
| *C01B 25/00* | (2006.01) |
| *C01B 31/00* | (2006.01) |
| *C01B 33/00* | (2006.01) |
| *C01B 35/00* | (2006.01) |
| *C01G 28/00* | (2006.01) |
| *C01G 30/00* | (2006.01) |

(52) U.S. Cl.
USPC .......... 423/213.5; 502/74; 502/185; 502/207; 502/213; 502/262; 502/263; 502/326; 502/327; 502/332; 502/333; 502/339; 502/349; 502/355; 502/415; 502/439; 502/527.19; 502/527.24

(58) Field of Classification Search
USPC ........... 423/22, 213.5; 502/74, 185, 207, 213, 502/262, 263, 326, 327, 332, 333, 339, 349, 502/355, 415, 439, 527.19, 527.24; 422/177, 180
See application file for complete search history.

(56) References Cited

U.S. PATENT DOCUMENTS

| | | |
|---|---|---|
| 3,840,471 A | 10/1974 | Acres |
| 3,998,758 A | 12/1976 | Clyde |

(Continued)

FOREIGN PATENT DOCUMENTS

| | | |
|---|---|---|
| DE | 28 55 102 | 7/1980 |
| DE | 100 64 622 | 7/2002 |

(Continued)

OTHER PUBLICATIONS

International Search Report dated Feb. 7, 2008 in the International (PCT) Application PCT/NO2007/000317 of which the parent application is the U.S. National Stage.

(Continued)

*Primary Examiner* — Cam N. Nguyen
(74) *Attorney, Agent, or Firm* — Wenderoth, Lind & Ponack, L.L.P.

(57) ABSTRACT

A method and device for catchment of platinum group metals (PGM) in a gaseous steam, where the method comprises using a catalyst comprising a porous ceramic body in which at least a part of the surface area is covered by one or more PGM-catching metal(s)/alloy(s), and where the device comprises the porous ceramic body in which at least a part of the surface area is covered by one or more PGM-catching metal(s)/alloy(s). In a further aspect, the invention also relates to a method for producing the inventive device.

2 Claims, 2 Drawing Sheets

Palladium coating on a zirconia sponge

(56) References Cited

U.S. PATENT DOCUMENTS

| | | |
|---|---|---|
| 4,572,904 A | 2/1986 | Onal |
| 4,774,069 A | 9/1988 | Handley |
| 4,869,891 A | 9/1989 | Handley |
| 4,912,076 A * | 3/1990 | Mizrah et al. ............... 502/300 |
| 5,004,709 A | 4/1991 | Stranford et al. |
| 5,052,926 A | 10/1991 | Kawasaki et al. |
| 5,122,496 A | 6/1992 | Vorlop et al. |
| 5,213,481 A * | 5/1993 | Stringfellow et al. ........ 417/252 |
| 5,217,939 A | 6/1993 | Campbell |
| 5,334,570 A | 8/1994 | Beauseigneur et al. |
| 5,346,722 A * | 9/1994 | Beauseigneur et al. ...... 427/300 |
| 5,384,110 A * | 1/1995 | Muramatsu et al. ........ 423/239.1 |
| 5,478,549 A | 12/1995 | Koch |
| 5,645,804 A * | 7/1997 | Sumiya et al. ............. 423/239.1 |
| 6,013,599 A | 1/2000 | Manson |
| 6,066,592 A | 5/2000 | Kawae et al. |
| 6,309,758 B1 | 10/2001 | Schmidt |
| 6,429,337 B1 | 8/2002 | Schmidt |
| 6,596,187 B2 | 7/2003 | Coll et al. |
| 7,041,622 B2 | 5/2006 | Nunan |
| 7,094,730 B2 | 8/2006 | LaBarge et al. |
| 7,119,046 B2 | 10/2006 | Ohno et al. |
| 7,375,053 B2 | 5/2008 | Schmidt |
| 7,465,690 B2 | 12/2008 | Yan |
| 7,504,355 B2 | 3/2009 | Carter et al. |
| 7,541,303 B2 | 6/2009 | Addiego et al. |
| 7,556,666 B2 | 7/2009 | Kunieda |
| 7,569,511 B2 | 8/2009 | Castellano et al. |
| 7,582,270 B2 * | 9/2009 | Zuberi ........................ 423/210 |
| 7,825,063 B2 | 11/2010 | Takeuchi et al. |
| 2002/0081255 A1 * | 6/2002 | Cutler et al. .............. 423/213.5 |
| 2005/0202966 A1 * | 9/2005 | Jantsch et al. ............... 502/325 |
| 2006/0210765 A1 | 9/2006 | Ohno et al. |
| 2006/0230732 A1 | 10/2006 | Kunieda |

FOREIGN PATENT DOCUMENTS

| | | |
|---|---|---|
| EP | 0 185 510 | 6/1986 |
| EP | 0 275 681 | 7/1988 |
| GB | 1 237 032 | 6/1971 |
| GB | 1 314 874 | 4/1973 |
| GB | 1 343 637 | 1/1974 |
| JP | 6-190253 | 7/1994 |
| WO | 96/16737 | 6/1996 |
| WO | 2006/065127 | 6/2006 |

OTHER PUBLICATIONS

PCT Written Opinion dated Feb. 7, 2008 in the International (PCT) Application PCT/NO2007/000317 of which the parent application is the U.S. National Stage.

International Preliminary Report on Patentability mailed Dec. 3, 2008 in the International (PCT) Application PCT/NO2007/000317 of which the parent application is the U.S. National Stage.

Norwegian Search Report dated Oct. 2, 2007 in corresponding Norwegian Application.

* cited by examiner

Figure 1. Palladium coating on a zirconia sponge
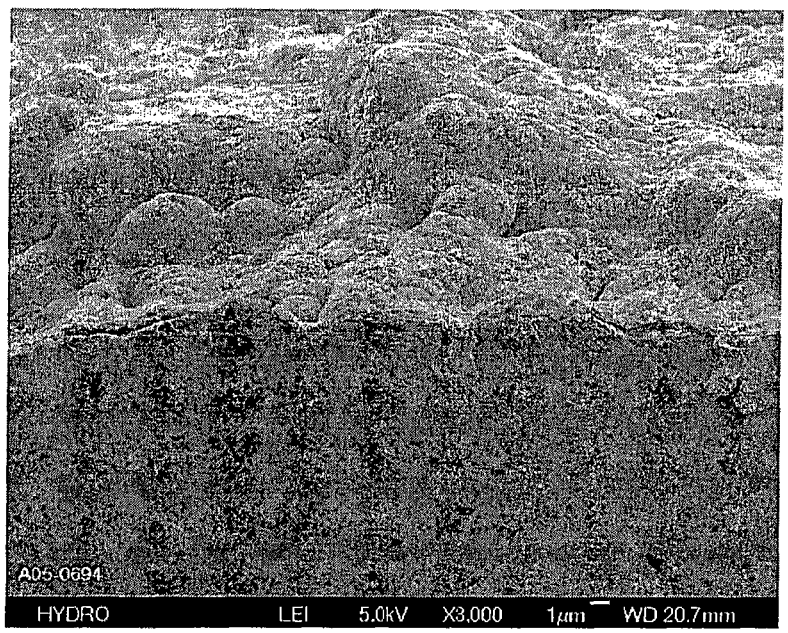
Figure 2. palladium coating on a zirconia sponge
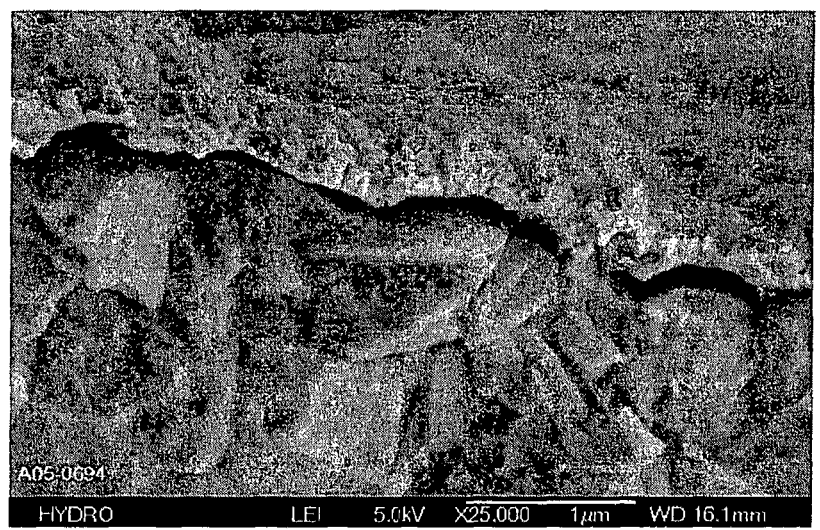

Figure 3. Platinum up-take on a Pd-coated zirconia sponge
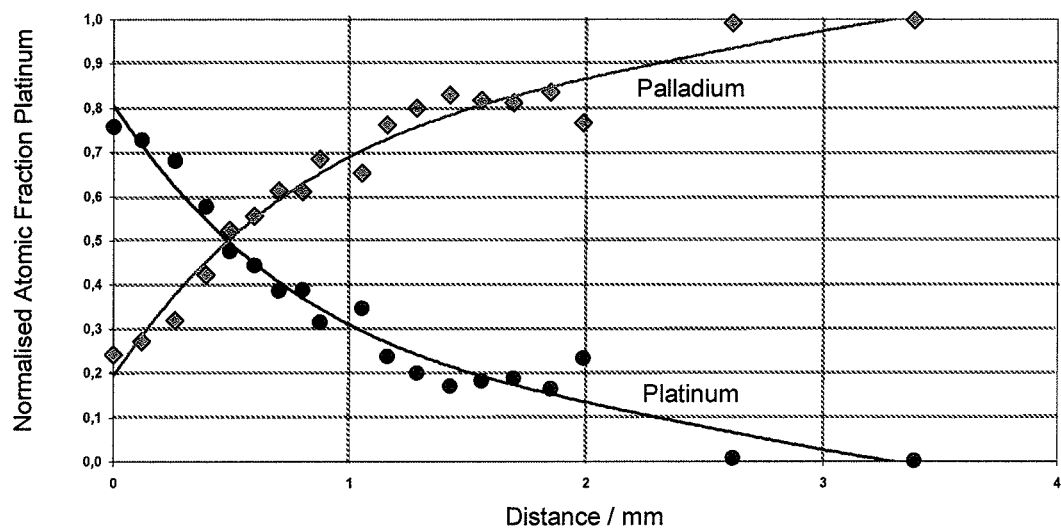

METHOD AND DEVICE FOR CATCHMENT OF PLATINUM GROUP METALS IN A GAS STREAM

This application is a Divisional Application of application Ser. No. 12/310,820, filed Jun. 9, 2009, now U.S. Pat. No. 8,105,975 which is a 371 Application of PCT/NO2007/000317, filed Sep. 7, 2007.

This invention relates to a method and device for catchment of platinum group metals (PGM) in a gaseous stream.

BACKGROUND

The main industrial process for producing nitric acid is known as the Ostwald route where ammonia, $NH_3$ is oxidised over a combustion catalyst at temperatures in the range of 800 to 1100° C. to form nitrogen monoxide, NO. The pressure ranges from atmospheric pressure to 10-12 bar. The formed nitrogen monoxide is quenched, mixed with air to form nitrogen dioxide, $NO_2$, and then the nitrogen dioxide is allowed to react with water to form nitric acid, $HNO_3$.

The typical combustion catalyst is one or more stacked gauzes made of woven or knitted wires of platinum alloyed with rhodium, and traces of grain refining elements. During operation the combustion catalyst loses platinum and to a lesser extent rhodium via the volatisation of $PtO_2$ and $RhO_2$. Thus it is common industrial practise to place catchment gauzes downstream of the combustion gauzes in order to recover a proportion of the platinum loss.

PRIOR ART

The current PGM-catchment technology is based on palladium or palladium based alloys (palladium, containing small amounts of platinum, and silver, gold, cobalt or nickel). The catchment alloy is installed in the form of gauzes, directly downstream of the platinum-based combustion gauzes. Typically, the catchment gauze is produced from 60 to 90 micron wire and is woven with a 1024 mesh (32 wires per linear cm), and 3 or 4 catchment gauzes would be installed.

The benefits of installing the catchment alloy in the form of a gauze are two-fold. In terms of their production, the catchment systems are made using the same technology as the combustion gauzes. The production method is therefore well known and proven. The main technological advantage of a gauze-based catchment system is the very high mass transfer characteristics of gauzes.

However, installing the catchment alloy in the form of gauzes has a number of disadvantages. Producing gauzes is a relatively expensive production process (producing wire and weaving or kitting the wire). To aid wire production the palladium is typically alloyed with a base metal, which evaporates in operation and thus continuously transports metal into the plant boilers). The surface area of a typical gauze (76 micron-1024 mesh) is relatively low (initially 1.5 $cm^2$ of metal per $cm^2$ of gauze). As the total catchment zone is narrow (0.4 to 0.6 mm) all the recovered platinum is located within this zone. Therefore, during a campaign, the openings in the catchment gauzes become progressively blocked. This leads to a large increase in pressure drop across the pack. A further problem related to the catchment gauzes is that the platinum-palladium alloy, that is formed during the catchment process, becomes embrittled. This, combined with the additional mechanical load on the gauzes, caused by the increased pressure drop, may lead to physical breakdown of the gauzes.

OBJECTIVE OF THE INVENTION

The main objective of this invention is to provide a method and device for catching platinum group metals in a gaseous stream that solves the above-mentioned problems.

A further objective is to provide a method for manufacturing the device according to the invention.

The objectives of the invention may be obtained by the features set forth in the following description of the invention and/or in the appended claims.

DESCRIPTION OF THE INVENTION

The invention utilises the realisation that gaseous streams through porous ceramic structures are substantially turbulent and that porous materials have relatively huge surface areas allowing excellent contact area between the flowing gas and the ceramic wall material, which leads to the favourable combination of high mass transfer coefficient of gaseous components onto the ceramic wall material and a huge surface area.

In a first aspect, the invention thus relates to a method for catching platinum group elements in a gaseous stream by passing the gas through a porous ceramic body coated with one or more PGM-catching metal(s) and/or alloy(s). The porous ceramic body may advantageously have all surface area covered by the one or more PGM-catching metal(s) and/or alloy(s) and the applied gas pressure may advantageously result in turbulent gas streams flowing through the channels in the ceramic body.

In a second aspect, the invention relates a device for carrying out the method according to the first aspect of the invention. Thus the second aspect of the invention relates to a porous ceramic body having at least a part of its surface area covered by one or more PGM-catching metal(s) and/or alloy(s). The ceramic body should may advantageously be a ceramic foam or sponge. Suitable ceramics may advantageously be one or more of the following: zirconia, alumina, alumino-silicate, but may also be of any ceramic or metallic material which may be coated with one or more metallic catalyst material(s) and which exhibits the necessary mechanical strength and chemical properties to withstand the conditions encountered in ammonia burners. Thus, the ceramic body can be made of one or more of the following materials: zirconia, alumina, alumino-silicate or a refractory oxide, silicate, carbide, boride, phosphate, nitride or a refractory metal. The porosity of the ceramic body may advantageously be in the range of 50 to 98% with a preferred pore size, defined by the number of pores per linear inch, in the range of 5 to 120 ppi. This corresponds to about 2 to 50 pores per cm. The deposited layer of one or more PGM-catching metal(s) and/or alloy(s) may have a thickness in the range from about 1 nm up to about 150 micron.

The surface area of ceramic foams according to the invention is comparable to that of a widely used monolith structure, with the same characteristic dimension (channel size and pore size). However, the mass transfer coefficient for a sponge of foam is comparable with that of wire gauzes, which is significantly higher than of a monolith, as turbulent flow is present throughout the depth of the sponge. Thus the invention provides a support system having a contact area greater than can be practically achieved with gauzes, but with a comparable mass transfer coefficient.

Currently, the most common catchment alloys are based on palladium, with the addition of alloying components to improve the wire drawing, weaving or knitting properties.

Examples of the systems include Pd—Au, Pd—Co and Pd—Ni binary alloys. Trace quantities of grain refining elements may also be present.

A the third aspect of the invention relates to a method for depositing the one or more PGM-catching metal(s)/alloy(s) onto the ceramic foam. An advantageous method is electroless plating, which is an autocatalytic coating method that allows both electrically conducting and insulating materials to be coated with a uniform metallic layer. In this method the ceramic object to be coated is activated by sequentially dipping into a tin solution and a palladium solution. The tin is adsorbed onto the surface as a $Sn^{2+}$ species, in sub-monolayer quantities. When the palladium contacts the $Sn^{2+}$, it will become reduced to metallic palladium:

$$Sn^{2+}+Pd^{2+} \rightarrow Sn^{4+}+Pd^\circ$$

After the activation process, the ceramic sponge is placed in a solution containing the metal that is to be deposited, which in our application is palladium, along with a reducing agent, such as hydrazine. The metallic palladium on the surface acts as a catalyst for the reduction of more palladium, by the hydrazine. By this means, a uniform layer of metallic palladium is deposited onto the surface. The coating thickness may be controlled by varying the coating time and the solution chemistry.

The palladium coating is deposited onto the surface of the support sponge via an electroless plating technique. The process involves an activation step and a coating step. The activation step consisted of the immersion of the sponge into a solution of tin (II) chloride; rinsing with deionised water and immersion into a solution of palladium chloride. The activation step was repeated between 5 and 10 times. During the activation process, the colour of the sponge changes to a pale grey colour. An example of the composition of an activation solution is shown in Table 1.

TABLE 1

| An example of the compositions of an activation solution | |
|---|---|
| $SnCl_2 \cdot 2H_2O$ | 1 g/l |
| HCl (37%) | 1 ml/l |
| Temperature | 25° C. |
| $PdCl_2$ | 0.1 g/l |
| HCl (37%) | 1 |
| Temperature | 25° C. |

After the activation of the sponge, it may be coated with palladium. The coating solution consists of an aqueous solution of palladium tetra-amine dichloride $(Pd(NH_3)_4Cl_2 \cdot 4H_2O$, which had been complexed with disodium ethylenediaminetetraacetic acid dehydrate (Na-EDTA), along with ammonium hydroxide, for a minimum of 12 hours. Just prior to the coating operation, the solution was heated to 60° C., and then hydrazine was added to the coating solution. An example of the composition of a coating solution is shown in Table 2. The coating solution is contacted with the sponges in a flow system, such that the solution flows through the sponge, or a series of sponges and after passing through them, is recycled. The solution is passed through the sponges for between 10 minutes and 1 hour.

TABLE 2

| An example of the composition of a coating solution | |
|---|---|
| $Pd(NH_3)_4Cl_2 \cdot H_2O$ | 4 g/l |
| $Na_2$-EDTA $\cdot 2H_2O$ | 40.1 g/l |

TABLE 2-continued

| An example of the composition of a coating solution | |
|---|---|
| $NH_4OH$ (28%) | 198 |
| Metal concentration | 16.3 mM |
| Ph | 10-11 |
| Temperature | 60° C. |

The thickness or palladium loading on the sponge is readily controlled by the temperature and time of the coating process. High temperatures and long time favour thicker coatings. If a thick layer of palladium is required, the coating solution may be replaced after a period of time.

LIST OF FIGURES

FIG. 1 shows a micrograph of a palladium coating on a zirconia sponge according to the preferred embodiment of the invention.

FIG. 2 is a close up of the interface region shown in FIG. 1.

FIG. 3 is a graph showing the platinum uptake of the preferred embodiment.

VERIFICATION OF THE INVENTION

The invention will be described in further detail by way of two verification experiments. These should not be considered as a limitation of the general inventive concept of employing a porous ceramic structure coated with one or more PGM-catchment alloy(s).

First Verification Experiment

A coated sponge was prepared by electroless plating. The zirconia sponge (45 ppi) was coated with 55.4 mg Pd per $cm^3$ sponge. The coated sponge (8.36 $cm^3$ containing 463 mg of palladium) was placed in a reactor, downstream of a source of platinum oxide vapour. The reactor was heated to 900° C. with a flow of air of 300 liters per hour. Platinum was evaporated at a rate of 0.22 mg per hour. After 335 hours, approximately 74 mg of platinum had passed through the sponge.

The sponge showed a weight increase of 67 mg. The sponge was washed in aqua-regia at 80° C. to dissolve all the platinum and palladium. The resulting solution was analysed by Inductively-Coupled Plasma Spectroscopy (ICP) to determine the platinum and palladium content. ICP analysis indicated that the sponge contained 66 mg of platinum and 462 mg of palladium. This indicates that 89% of the platinum was recovered. This value is at the very high end of what may be achieved with a standard gauze-based catchment system. Typically, platinum varies from 80 to 85%, although lower and higher values are achieved in some campaigns. It is also possible that less than 74 mg of platinum passed through the sponge, during the catchment test (deposits on the wall of the reactor or on the platinum filament support. In that case, the true catchment efficiency exceeds 89%.

A profile of platinum uptake on a Pd-coated sponge, after a two-week catchment test, was determined using SEM analysis. The profile is shown in FIG. 3. It is observed that after the two-week exposure to platinum vapour, the platinum is recovered in the first few millimeters of the sponge. It is anticipated that as the mass transfer coefficient will be high throughout the length of the sponge, the high recovery efficiency of platinum would continue.

Second Verification Experiment
Preparation of Sponges

Zirconia sponges, with a cell size of 80 pores per inch (ppi), were produced in a size of 4.8×4.8×1.0 cm. These sponges were coated with palladium via the electroless plating technique, to give a palladium loading of approximately 3 g per sponge, which is equivalent to 0.13 g per $cm^2$ of sponge, as it is installed in the reactor (3 g/(4.8×4.8 cm)).

This palladium loading is comparable to the loading of 4×76 micron palladium recovery gauzes, woven with a 1024 mesh geometry.

To fit into the circular pilot-reactor (23 cm diameter), nine whole sponges are installed in a 3×3 configuration, at the centre of the reactor, and sponges are then cut to shape to fill the gaps in the bed.

Testing of Sponges

The sponges and gauzes, were loaded into the reactor in the following manner (from the top or in the direction of gas flow):

1. 5× combustion gauzes composed of a proprietary Yara design
2. The first layer of the palladium coated sponge (10 mm thick)
3. A wire screen composed of a heat resisting alloy
4. The second layer of the palladium coated sponge (10 mm thick)
5. A wire screen composed of a heat resisting alloy
6. 2× palladium gauzes (76 micron and 1024 mesh)

The heat resisting alloy screens are to aid the separation of the screens after pilot plant testing. The 2× palladium gauzes are a conventional platinum recovery system.

The above system is installed in the pilot reactor. A 10.5% ammonia in air mixture is used as the feedstock, and the plant is run at 900° C. and 5 bar pressure. The gas load is calculated to give a 10 ton nitrogen/$m^2$ reactor/day.

After running for approximately one week, the above combustion and recovery system is removed from the pilot-plant. After weighing the gauzes, a circular patch, above the centre of one of the sponges is cut out. A patch of the palladium gauze located below the centre of the sponge is also removed. The upper and lower sponges are removed and replaced with fresh sponges. Patches of the combustion gauzes and the recovery gauzes are placed in the holes from where the gauze samples were taken. The whole pack is then reinstalled in the pilot plant and combustion of ammonia commenced. After a further week, the above sampling procedure was repeated.

The weighed gauzes and sponges were soaked in hot aqua-regia, to dissolve all the platinum, rhodium and palladium. In the case of the sponges, after washing and drying, the sponges were weighed again, to show the loss of metal. After dilution, the composition of the acid solutions were analysed by Inductively-Coupled Plasma Spectroscopy (ICP).

The above procedure allows the mass balance of the system to be determined, thus giving the efficiency of the platinum recovery and palladium loss of the sponge system. The presence of conventional palladium gauzes below the sponges, are in place to demonstrate, categorically, if platinum is passing through the sponges.

The sampling procedure is repeated for four times, giving information as to how the catchment efficiency of the sponges changes.

The above experiments were complemented by similar measurements in which the sponges are replaced with conventional palladium-based recovery gauzes (4 gauzes with 76 micron wire and 1024 woven mesh size).

The catchment efficiency of the system (upper and lower sponges and palladium-based gauzes) is made by determining the platinum weight loss from the combustion gauzes (normalised to area–g Pt/$cm^2$ reactor), and the weight increase of platinum in the sponges and lower recovery gauzes; again normalised to area.

Data for platinum recovery on the upper and lower Pd-coated sponges are shown in Table 3.

TABLE 3

| Days on Stream | Combustion Gauzes Pt Loss/mg·$cm^{-2}$ | Upper Pd Coated Sponge | | Lower Pd Coated Sponge | | Lower Pd Gauzes Pt Gain/mg·$cm^{-2}$ |
|---|---|---|---|---|---|---|
| | | Pt Gain/mg·$cm^{-2}$ | % Recovery | Pt Gain/mg·$cm^{-2}$ | Total % Recovery | |
| 8.02 | 2.4419 | 2.4105 | 98.7 | 0.3255 | 100+ | 0 |
| 13.99 | 3.9004 | 3.727 | 95.6 | 0.5642 | 100+ | 0 |
| 18.45 | 5.1557 | 4.705 | 91.2 | 0.7378 | 100+ | 0 |
| 26.22 | 7.9957 | 6.901 | 86.3 | 0.8246 | 96.6 | 0 |

There was no indication of platinum being recovered on the lower Pd-based gauzes, located below the lower Pd-Coated sponge.

The data for platinum recovery on conventional palladium-based recovery gauzes, tested under the same conditions as the above, are shown in Table 4.

TABLE 4

| Days on Stream | Combustion Gauzes Pt Loss/mg·$cm^{-2}$ | Conventional Pd Recovery Gauzes | |
|---|---|---|---|
| | | Pt Gain/mg·$cm^{-2}$ | % Recovery |
| 6.81 | 2.0461 | 1.6757 | 85.9 |
| 13.33 | 3.908 | 3.1511 | 80.6 |
| 20.1 | 6.0095 | 4.9222 | 81.9 |
| 27.07 | 8.4286 | 6.7558 | 80.2 |
| 33.1 | 11.3177 | 7.8110 | 69.0 |

It is clearly demonstrated that the recovery efficiency of the Pd-coated sponges is superior to that of conventional recovery gauzes, when the same area mass of palladium is installed (compare the recovery efficiency of the first sponge layer with the gauze-based system. By installing a large amount of palladium (i.e. the addition of a second sponge) the recovery efficiency is enhanced further.

The second issue regarding platinum recovery using palladium-based system, is the amount of palladium lost during the recovery of platinum. Experience has shown, that when using gauze-based recovery systems, approximately 1 g of palladium is lost, when recovering 1 g of platinum.

TABLE 5 shows the palladium losses during platinum recovery, for a Pd-coated sponge and a pure palladium alloy.

| Platinum Recovery on gauze/g | Palladium Loss On gauze/g | Ratio Pd loss/Pt recovery | Platinum Recovery on sponge/g | Palladium Loss on sponge/g | Ratio Pd loss/Pt recovery |
|---|---|---|---|---|---|
| 1.14 | 0.93 | 0.81 | 1.18 | 0.87 | 0.73 |
| 1.85 | 1.77 | 0.95 | 1.82 | 1.27 | 0.69 |
| 2.60 | 2.43 | 0.93 | 2.30 | 1.40 | 0.61 |
| 2.84 | 2.54 | 0.89 | 3.39 | 1.42 | 0.41 |

It is clearly demonstrated that the palladium loss, during platinum recovery, is significantly lower with the Pd-coated sponge than with a conventional Pd-gauze based system.

The invention claimed is:

1. A method for catching platinum group metals in a gaseous stream, comprising passing a gaseous stream containing platinum group metals through pores of a porous ceramic body at least partially coated with one or more PGM-catching metal(s)/alloy(s).

2. The method according to claim 1, wherein a gas pressure is applied to the gaseous stream to induce the gaseous stream to flow through the pores in the porous ceramic body.

* * * * *